(12) United States Patent
Finn

(10) Patent No.: US 6,462,701 B1
(45) Date of Patent: Oct. 8, 2002

(54) SYSTEM AND METHOD FOR CONTROLLING AIR BAG DEPLOYMENT SYSTEMS

(75) Inventor: James S. Finn, Huntsville, AL (US)

(73) Assignee: Time Domain Corporation, Huntsville, AL (US)

( * ) Notice: Subject to any disclaimer, the term of this patent is extended or adjusted under 35 U.S.C. 154(b) by 0 days.

(21) Appl. No.: 09/718,180

(22) Filed: Nov. 21, 2000

(51) Int. Cl.[7] .................. G01S 13/00; B60R 21/32; B60R 22/00; E05F 15/00; G05D 1/00; G05D 3/00; G06F 17/00; G06F 7/00
(52) U.S. Cl. ................. 342/72; 280/735; 701/45
(58) Field of Search .............. 342/72; 280/735; 701/45

(56) References Cited

U.S. PATENT DOCUMENTS

| | | | | |
|---|---|---|---|---|
| 5,829,782 A | * | 11/1998 | Breed et al. | 280/735 |
| 6,081,757 A | * | 6/2000 | Breed et al. | 701/45 |
| RE37,260 E | * | 7/2001 | Varga et al. | 367/99 |
| 6,272,411 B1 | * | 8/2001 | Corrado et al. | 701/45 |
| 6,290,255 B1 | * | 9/2001 | Stanley et al. | 280/735 |
| 6,302,438 B1 | * | 10/2001 | Stopper, Jr. et al. | 280/735 |
| 6,341,252 B1 | * | 1/2002 | Foo et al. | 701/45 |

* cited by examiner

Primary Examiner—Thomas H. Tarcza
Assistant Examiner—Brian Andrea
(74) Attorney, Agent, or Firm—Waddey & Patterson; Larry W. Brantley

(57) ABSTRACT

A system and method for controlling air bag deployment systems based on the presence, position, size, and weight of a person present in an automobile or a child seat present in an automobile is disclosed. In one embodiment, the system includes a radar transmitter, radar receiver, and a processor. In alternative embodiments, the system further includes a weight sensor, a reflector, and a child seat reflector. The transmitter generates and transmits ultra-wide band (UWB) pulses and the receiver generates a receiver signal based on reflected UWB pulses received by the receiver. The receiver signal contains information indicative of the presence, position, and size of a person in the automobile. In addition, the receiver signal may contain information regarding the presence of a child seat in the passenger side seat of the automobile. The weight sensor generates a weight signal indicative of a weight present in either the passenger side seat or the driver side seat of the automobile. The processor either inhibits deployment or controls the rate of deployment of an airbag located in the automobile based on the receiver signal and the weight signal. Alternatively, the processor compares the receiver signal and the weight signal to a set of predetermined receiver signal profiles and weight signal profiles and controls deployment of the airbag based on matching receiver signal and weight signal profiles.

7 Claims, 4 Drawing Sheets

SYSTEM AND METHOD FOR CONTROLLING AIR BAG DEPLOYMENT SYSTEMS

Be it known that I, James S. Finn, a citizen of United States, residing at 2413 Woodview Drive, Huntsville, Ala. 35801 have invented a new and useful "System And Method For Controlling Air Bag Deployment Systems."

BACKGROUND OF THE INVENTION

The present invention relates generally to a system and method for controlling air bag deployment systems. More particularly, the present invention provides a system and method for controlling air bag deployment systems based on the presence, position, size, and weight of persons for which the air bag deployment system is designed to protect.

Safety restraint systems which self-actuate from an undeployed to a deployed state without the need for intervention by the operator, i.e., "passive restraint systems," and particularly those restraint systems incorporating inflatable bags or cushions, as well as the use of such systems in motor vehicles have gained general appreciation.

It is well known that a vehicle occupant may be protected using a cushion or bag that is inflated with gas, e.g., an "air bag", when the vehicle encounters sudden deceleration, such as in a collision. During deployment, the rapidly evolving gas with which the bag is typically filled is an inert gas, e.g., nitrogen. In such systems, the air bag is normally housed in an uninflated and folded condition to minimize space requirements. In an emergency, gas is discharged from an inflator to rapidly inflate the air bag. The air bag, upon inflation, serves to restrain the movement of the vehicle occupant as the collision proceeds. In general, such air bags are commonly designed to be inflated in no more than a few milliseconds.

Vehicular inflatable restraint systems generally include multiple crash sensors positioned about or mounted to the frame and/or body of the subject vehicle and serve to sense sudden decelerations by the vehicle. In turn, the sensor sends a signal to an air bag module or assembly strategically positioned within the riding compartment of the vehicle to actuate deployment of the air bag. In general, an air bag provided for the protection of a vehicle driver, i.e., a driver side air bag, is mounted in a storage compartment located in the steering column of the vehicle. An air bag for the protection of a front seat passenger, i.e., a passenger side air bag, is typically mounted in the instrument panel/dash board of the vehicle.

Typical air bag restraint systems make use of an air bag module that generally includes an outer reaction housing or canister, commonly referred to as a "reaction can" or, more briefly, as a "can". The reaction canister generally serves to support or contain other components of the air bag module system, including what is referred to as a "air bag inflator" or, more briefly, as an "inflator", or, alternatively, as a "generator". The inflator, upon actuation, acts to provide the gas to inflate the air bag.

Inflators used in such systems are typically either of a pyrotechnic or hybrid type. Pyrotechnic inflators generally contain a gas generating material, which upon activation generates gas used to inflate the air bag. In general, the inflation gas produced by a pyrotechnic inflator is emitted from openings or emission ports along the length of the inflator.

In contrast, hybrid inflators, in addition to a body of ignitable pyrotechnic material, generally contain as the primary inflation gas a stored, compressed gas which, upon proper actuation, is expelled from the inflator. As a consequence of the physics associated with the storage of compressed gases, the container used to store this compressed gas typically has a cylindrical shape. Furthermore, the discharge of gas from such a cylindrically shaped gas storage container typically occurs by way of openings or emission ports at only one end of the cylindrical container.

It is generally desired that the air bag attain a straight or a non-skewed geometry upon deployment, particularly where the air bag module assembly is for installation midmount within a vehicle dashboard or panel, that is in a central region of the vehicle dashboard or panel, between the upper and lower portions thereof and for which the direction of the bag deployment towards the vehicle occupant is generally perpendicular. Such an installation is commonly referred to as a "mid-mount installation."

To that end, it is generally desired that the emission of gas into the air bag from such a storage container be done in a fairly uniform manner. With typical air bag/inflator assemblies, such uniform emission is generally attained by having a relatively even emission of gas into the deploying bag along the length of the gas inlet opening of the air bag connected, directly or indirectly, to the inflator. In this way the bag is properly uniformly deployed and the risk of the bag deploying in a skewed manner due to the discharge of gas from only one end of the storage container is avoided.

As mentioned above, airbags have proven to be effective in preventing injury resulting from head-on and near headon collisions, when used correctly in conjunction with the shoulder-lap restraints. However, a small number of highly publicized incidents have highlighted a serious risk of potentially catastrophic injury to small adults, children, or infants in rear-facing child-safety seats. While it is certainly advisable to place small children or infants occupying rear-facing child-safety seats in a rear seat, in certain types of vehicles, namely pick-up trucks, this is simply not an option.

As a result, a demand has arisen for selective deployment of the automobile's self-inflating restraint. In response, certain automobile manufacturers now provide a key-switch to allow the owner/operator to choose whether or not the self-inflating restraint should be "armed" that is to say, whether the self-inflating restraint should be active and deployable in the event of a collision. However, these types of manual controls, or overrides, also carry an inherent risk: the inadvertent failure to re-arm the restraint for an adult passenger, or the failure to deactivate the restraint in the event that the passenger seat is occupied by a child or safety seat. Further, the state of the art airbag deployment system does not detect whether the passenger seat is unoccupied and in the event of a collision fires the airbag, needlessly resulting in the unnecessary expense of replacing the dash and airbag mechanism.

Smart systems now being tested include seat antennas that monitor changes in electric fields; child seats with built-in detectors, and ultrasonic sensors similar to submarine sonar. However, none of these technologies have proven to be as useful as needed and are very costly to implement. Furthermore, these systems are very inaccurate and therefore can only provide a gross approximation of the size of the occupant.

What is needed, then, is a device that can ascertain the presence, position, size, and weight of the vehicle occupants and either deactivate the air bag system in response to small adults or children or to adjust the inflation rate of the airbag.

SUMMARY OF THE INVENTION

It is therefore an object of the present invention to provide a novel method and apparatus for controlling air bag deployment systems.

Another object is to provide a means for determining the presence of the occupants for which the air bag system is designed and a means for controlling the air bag system based on the presence of the occupants.

A further object of the present invention is to provide a means for determining the position of the occupants relative to the air bag system and a means for controlling the air bag system based on the position of the occupants.

Another object of the present invention is to provide a means for determining the size of the occupants for which the air bag system is designed and a means for controlling the air bag system based on the size of the occupants.

Still another object is to provide a means for determining the weight of the occupants relative to the air bag system and a means for controlling the air bag system based on the weight of the occupants.

Yet another object is to provide a means for determining the presence of a child safety seat and a means for controlling the air bag system based on the presence of the child safety seat.

These and other objects are provided, according to the present invention, by a system and method for controlling air bag deployment systems including an impulse radio radar to determine the presence, position, size, and weight of the occupants for which the air bag system is designed to detect and for interfacing the information relating to presence, position, size, and weight of the occupant with a variable rate airbag deployment means or an airbag deactivation means.

DESCRIPTION OF THE PREFERRED EMBODIMENTS

Figure 1:
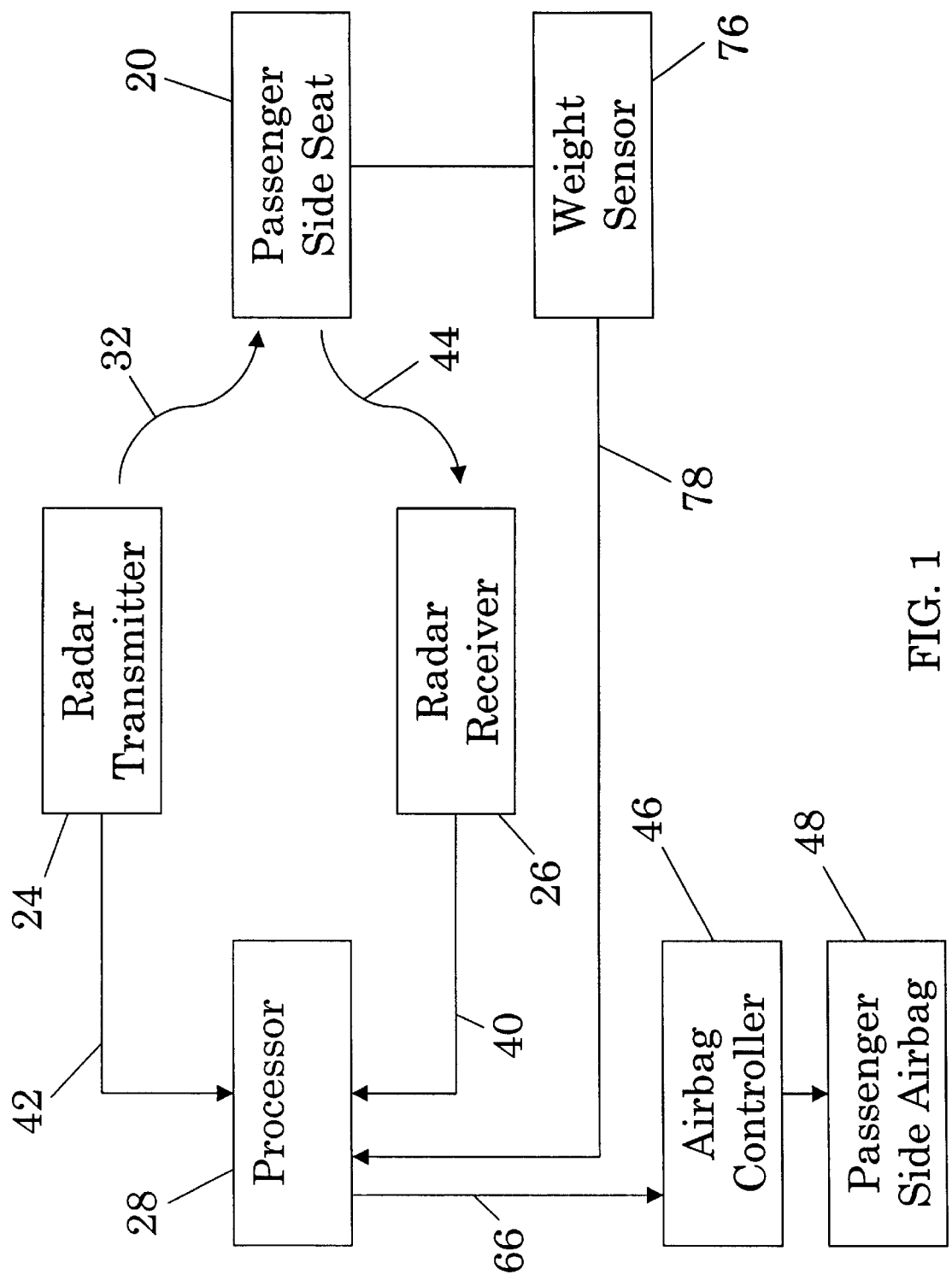
FIG. 1 is a block diagram of a first embodiment of the present invention designed to detect the presence and position of vehicle occupants.

In a first embodiment designed to detect the presence and position of a person in a passenger side seat 20 in an automobile (see FIG. 1), the present invention includes a radar transmitter 24, a radar receiver 26, and a processor 28. Radar transmitter 24 is preferably a time-modulated ultra wide band radar transmitter (TM-UWB) and radar receiver 26 is preferably a TM-UWB radar receiver. TM-UWB (or impulse) radio and radar technology was first fully described in a series of patents issued to Larry W. Fullerton, including U.S. Pat. No. 4,641,317 (issued Feb. 3, 1987), U.S. Pat. No. 4,743,906 (issued May 10, 1988), U.S. Pat. No. 4,813,057 (issued Mar. 14, 1989), U.S. Pat. No. 4,979,186 (issued Dec. 18, 1990), and U.S. Pat. No. 5,363,108 (issued Nov. 8, 1994). A second generation of TM-UWB patents issued to Fullerton et al. includes U.S. Pat. No. 5,677,927 (issued Oct. 14, 1997), U.S. Pat. No. 5,687,169 (issued Nov. 11, 1997) and U.S. Pat. No. 5,832,035 (issued Nov. 3, 1998). These patent documents are incorporated herein by reference. Although the description herein is related to TM-UWB radar systems, other types of radar systems may be employed as well.

Radar transmitter 24 and radar receiver 26 are designed to be mounted in the dashboard of the automobile. Those skilled in the art will recognize that radar transmitter 24 and radar receiver 26 may be mounted in different areas within the automobile as well. In addition, radar transmitter 24 and radar receiver 26 may be combined into one single unit called a radar transceiver. Radar transmitter 24 is operable to generate and transmit ultra wide band (UWB) pulses 32 toward the passenger side seat 20 of automobile 22. In an alternative embodiment (not shown), radar transmitter 24 is operable to generate and transmit UWB pulses 32 toward a driver side seat of an automobile.

Radar transmitter 24 may utilize a single antenna element for transmission or an array of antenna elements for transmission, including phased arrays of antennas. In a similar manner, radar receiver 26 may also use a single antenna element or an array of antenna elements for reception. Those skilled in the art will recognize that the number and type of antenna elements may vary based on the particular application and desired transmission characteristics.

Processor 28 is connected to transmitter 24 and receiver 26, and is designed to process a receiver signal 40 and a transmitter signal 42 to determine the presence and position of a person in the passenger side seat of the automobile. Receiver signal 40 is generated by receiver 26 based on reflected signal portion 44 received by receiver 26. Transmitter signal 42 is generated by transmitter 24 and contains information indicative of the transmission time of UWB pulses 32. Processor 28 is also connected to an airbag controller 46, which controls the deployment of a passenger side airbag 48 located in dashboard 30 on the passenger side of the automobile. In an alternative embodiment (not shown), air bag controller 46 may also be connected to a driver side airbag located in the steering column of the automobile.

To determine whether a person is sitting in passenger side seat 20, the first embodiment operates in the following manner. Radar transmitter 24 transmits UWB pulses 32 toward passenger side seat 20. A reflected signal portion 44 of UWB pulses 32 (also referred to as reflected pulses 44) is reflected back toward the receiver 26 from passenger side seat 20 or from an object located within passenger side seat 20. Reflected signal portion 44 contains a reflected pulse energy that varies according to whether or not an object is present in passenger side seat 20.

The receiver 26 generates receiver signal 40 based on the reflected pulse energy contained within reflected signal portion 44 of UWM pulses 32. In practice, the receiver signal 40 is basically a voltage signal that is generated by receiver 26 based on the reflected pulse energy received by the receiver 26. If the amount of energy received is high, the receiver 26 generates a receiver signal 40 having a large maximum voltage. If the amount of energy is low, the receiver 26 generates a receiver signal 40 having a low maximum voltage.

In practical applications, receiver signal 40 will contain three primary signal elements: stationary clutter signal, variable clutter signal, and target response signal. The stationary clutter signal may be defined as that portion of receiver signal 40 generated as a result of energy reflected from the roof, sides, windows, and other permanently fixed items within the interior of the automobile. The variable clutter signal is that portion of receiver signal 40 generated by energy reflected from items within the automobile that may move over time, e.g., the driver side seat and the passenger seat. The target response signal is the portion receiver signal 40 generated by energy reflected off of an object, i.e., the person sitting in the automobile.

Based on receiver signal 40, processor 28 determines whether a person is present in the passenger side seat. For example, in one version of the first embodiment, processor 28 simply compares receiver signal 40 to a threshold voltage. If the receiver signal 40 is above the threshold voltage, the processor 28 determines that a person is present in passenger side seat 20 and generates a processor signal 66 that allows the airbag controller 46 to deploy passenger side airbag 48 in the event of a collision. If the receiver signal 40 is below the threshold voltage, then the processor 28 determines that a person is not present in passenger side seat 20 and, accordingly, generates a processor signal 66 that prevents the airbag controller 46 from deploying passenger side airbag 48.

Air bag deployment systems currently in use in the art usually include a collision sensor known in the art for use in controlling the deployment of airbags. The collision sensor is usually connected to an airbag and a processor, and is designed to generate a collision signal when the automobile is involved in a collision. The processor, in turn, is designed to process the collision signal to determine whether a collision has occurred and to control the deployment of the airbag based on this determination. The present invention contemplates modifying an existing processor in an air bag deployment system to include the functionality attributed to processor 28 described above. In the alternative, the present invention envisions connecting processor 28 to an existing processor used with an air bag deployment system.

In this first embodiment, certain situations may arise that may cause processor 28 to incorrectly determine that a person is sitting in passenger side seat 20. For example, one may place a bag of groceries or books in passenger side seat 20. In this case, the bag of groceries or books may reflect enough of UWB pulses 32 to cause the processor 28 to determine that a person is sitting in passenger side seat 20 and to allow the deployment of passenger side airbag 48. Obviously, this is an undesirable result. Deploying airbag 48 to protect a bag of groceries is unnecessary and, more importantly, means that the deployed airbag will have to be replaced. Replacement of airbag 48 is an expensive and time-consuming process.

One solution is to include a weight sensor 76 connected to passenger side seat 20 in the automobile and to processor 28. Weight sensor 76 is designed to generate a weight signal 78 in response to a weight present in passenger side seat 20. Weight sensors are well known in the art and several difference types of weight sensors may be used.

In this variation on the first embodiment, the processor 28 first compares the receiver signal 40 to the threshold voltage. If the receiver signal 40 is above the threshold voltage, then processor 28 processes weight signal 78 to determine a weight present in passenger side seat 20. If the weight present in the passenger side seat is above a threshold weight, then processor 28 determines that a person is sitting in passenger side seat 20. If the weight indicated by weight signal 78 is below the threshold weight, then processor 28 determines that a person is not sitting in passenger side seat 20.

If the receiver signal 40 is below the threshold voltage, processor 28 may process weight signal 78 in an attempt to confirm the determination that a person is not sitting in passenger side seat 20. Specifically, if the weight indicated by weight signal 78 is above the threshold weight, processor 28 may process receiver signal 40 a second time to confirm that receiver signal 40 is below the threshold voltage. Although weight sensor 76 has been discussed in conjunction with passenger side seat 20, weight sensor 76 may also be used in making the determination of whether a person is sitting in a driver side seat. In this case, weight sensor 76 would be connected to the driver side seat and processor 28, and operate as described above with reference to passenger side seat 20.

To determine the position of a person sitting in passenger side seat 20 relative to passenger side airbag 48, processor 28 processes receiver signal 40 in order to determine a reception time that receiver signal 40 exceeds the threshold voltage. Processor 28 also monitors transmitter signal 42 in order to determine a transmission time for UWB pulses 32. Processor 28 then calculates the difference between the reception time and the transmission time in order to determine the amount of time that passed between transmission of the UWB pulses 32 and when receiver signal 40 exceeded the threshold voltage. By analyzing the time between the transmission time of the UWB pulses 32 and the reception time (also referred to as the time of flight), processor 28 can determine the position of the person with respect to receiver 26. Since UWB pulses 32 travel at a known rate of speed, the time of flight may be converted into the distance traveled by UWB pulses 32 and reflected signal portion 44 and, in turn, the distance traveled may be used to determine the position of the person with respect to receiver 26. Thus, the time of flight may be used to determine the position of the person with respect to receiver 26. Since the position of receiver 26 is a known distance from passenger side airbag 48 itself, processor 28 can determine the position of the person with respect to passenger side airbag 48.

Those skilled in the art will recognize that more reflected energy will be measured per transmitted pulse for nearby objects, as compared to those objects positioned farther away. Compensating for this effect allows for more efficient use of the radar's dynamic range. In a preferred embodiment, radar transmitter 24 transmits and radar receiver 26 receives an increasing number of pulses per discrete range step as the range is increased. The reflected energy measured at longer ranges is therefore increased by receiving and integrating a greater number of pulses. The ranges of interest are preferably divided into multiple "range windows," where the same number of pulses is transmitted for each discrete range within a given window. Skilled artisans will recognize that this is only one example of how this compensation might be implemented.

Alternatively, the power of transmitted pulses may be varied according to range. In this embodiment, radar transmitter 24 increases the power of transmitted pulses as the range gets longer. This alternative compensation has a similar effect to varying the number of transmitted pulses, but will likely require more costly modifications to the basic radar transmitter 24 to implement. This, and other related concepts are described in commonly owned, co-pending U.S. patent application Ser. No. 09/332,501 filed Jun. 14, 1999 and entitled "System and Method for Impulse Radio Power Control," which is incorporated herein by reference.

Once the position of the person with respect to passenger side airbag 48 is known, processor 28 can control deployment of passenger side airbag 48 based on this information.

For example, if the person is closer than ten inches from passenger side airbag 48, processor 28 generates a processor signal 66 that prevents airbag controller 46 from deploying passenger side airbag 48. Processor 28 can determine that a person is closer than ten inches by comparing the time of flight associated with the person to a predetermined set of possible values for the time of flight, each value corresponding to a person located at a different distance from passenger side airbag 48.

On the other hand, if the person is more than ten inches away from passenger side airbag 48, processor 28 generates a processor signal 66 that allows the air bag controller 46 to deploy passenger side airbag 48 during an automobile collision. Similar processing may be performed to control the deployment of a driver side airbag. Additional information regarding using UWB radars to determine position may be found in U.S. Pat. Nos. 4,743,906 and 5,363,108, incorporated by reference above.

Alternatively, processor 28 may cause airbag controller 46 to deploy passenger side airbag 48 using various rates of deployment based on the position of the person in the automobile. For example, if the person is more than 10 inches away from passenger side airbag 48, processor 28 generates a processor signal 66 that causes airbag controller 46 to deploy passenger side airbag 48 at the highest rate of deployment possible. If, on the other hand, the person is less than 10 inches away from driver side airbag 48, processor 28 generates a processor signal 66 that causes airbag controller 46 to deploy passenger side airbag 48 at approximately half the highest rate of deployment. Once again, processor 28 simply analyzes the time of flight to determine the position of the person with respect to passenger side seat 20.

Variable rate deployment systems are well known in the art. Such systems typically include multi-stage inflators wherein various combinations of the stages may be activated in order to achieve a desired rate of deployment. Other such systems include the use of control valves to control the rate of deployment. The present invention contemplates using one of these systems to control the rate of deployment of passenger side airbag 48 and driver side airbag 50.

In another variation of the first embodiment, the processor 28 includes a memory for storing receiver signal profiles. Each receiver signal profile represents a receiver signal 40 indicative of a specific set of occupancy parameters. For example, one of the receiver signal profiles may be indicative of an average size male sitting in the driver side seat. This receiver signal profile may be generated by placing an adult male into the automobile, transmitting UWB pulses 32 using the transmitter 24, and using processor 28 to record in the memory receiver signal 40 generated by receiver 26 in response to reflected signal portion 44. The recorded receiver signal profile is then indicative of receiver signal 40 one would expect to see if an adult male was sitting in the driver seat of the automobile. An unlimited number of receiver signal profiles may be generated in a similar manner using small children, small adults, large adults, bags of groceries or books.

In this variation of the first embodiment, processor 28 simply compares receiver signal 40 with the receiver signal profiles and selects the matching receiver signal profile, that is, the receiver signal profile most similar to the receiver signal 40 under analysis. Processor 28 then determines whether a person is present, and what type of person, small person, large person, etc. based on the matching receiver signal profile.

Alternatively, the memory may contain stationary clutter signal profiles, variable clutter signal profiles, and target response signal profiles, rather than receiver signal profiles. As discussed previously, the stationary clutter signals are simply that portion of receiver signal 40 associated with energy reflected off of stationary objects within the automobile. In a similar manner, the variable clutter signals represent that portion of the receiver signal 40 associated with energy reflected off of moveable objects within the automobile. Finally, the target response signals represent that portion of the receiver signal 40 associated with energy reflected off of the target, i.e., a person.

The stationary clutter signal profiles are obtained by transmitting UWB pulses 32 when only stationary objects are present in the automobile and recording into the memory the resulting receiver signal 40 generated by receiver 26. The variable clutter signal profiles may be generated in a similar manner. The target response signal profiles may be generated by transmitting UWB pulses 32 when an object or target, i.e., a person, bag of groceries, etc., is present in the automobile, measuring the receiver signal 40 generated by receiver 26, subtracting the stationary clutter profile from the receiver signal 40, and subtracting one of the variable clutter signal profiles from the receiver signal 40. Note that there will be a different target response signal profile for each combination of stationary clutter signal profile and variable clutter signal profile.

In this variation, processor 28 subtracts the stationary clutter signal profiles and one of the variable clutter signal profiles from the receiver signal 40 to generate a target response signal. Processor 28 then determines the matching target response signal profile, that is, the target response signal profile that matches the target response signal. If no target response signal profile matches, the processor 16 generates a new target response signal by subtracting the stationary clutter signal profiles and a different one of the variable clutter profiles. Processor 16 then compares this new target response signal to the target response signal profiles in order to determine the matching target response signal profile. Once processor 28 identifies the matching target response signal profile, processor 28 determines whether a person is present, and what type of person, small person, large person, etc. based on the matching target response signal profile.

In still another variation on the first embodiment, weight signal profiles may be used in conjunction with receiver signal profiles or target response signal profiles to determine whether and what type of person is present in the automobile. A weight signal profile is simply a weight signal 78 associated with a specific weight. For example, if a small child were present you would expect to see a weight signal 78 indicative of a small weight. If a large adult were present you would expect to see a weight signal 78 indicative of a large weight.

Figure 2:
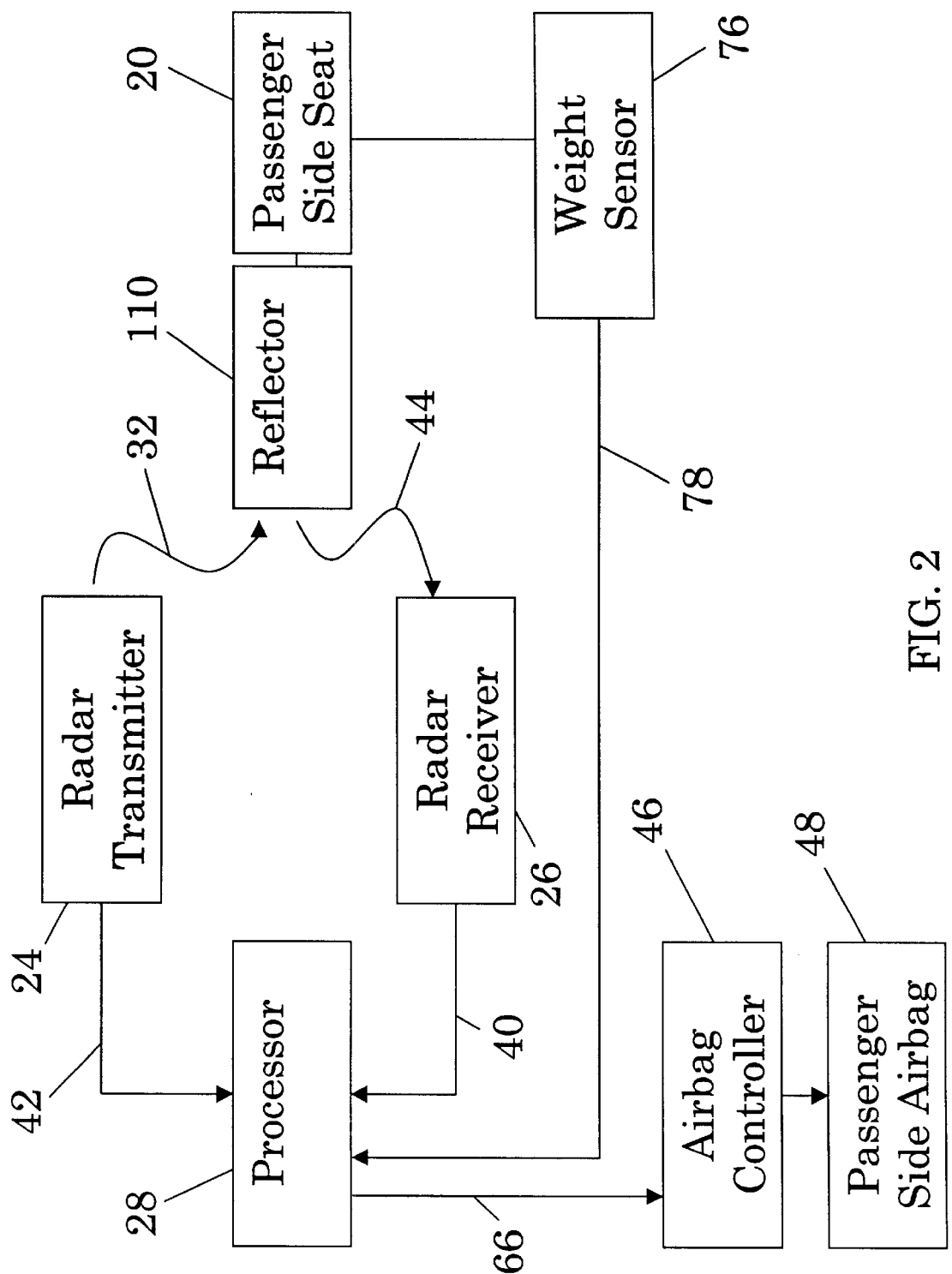
FIG. 2 is a block diagram of a second embodiment of the present invention designed to detect the size of vehicle occupants.

In a second embodiment designed to detect a size (or size information) of a person in passenger side seat 20 in an automobile (see FIG. 2), the present invention includes radar transmitter 24, radar receiver 26, processor 28, memory 50, airbag controller 46, weight sensor 76, and passenger side airbag 48 as described above. In addition, the second embodiment includes a reflector 110. Reflector 110 is designed to be mounted in passenger side seat 20 and to modify reflected signal portion 44 to include size information regarding a person sitting in passenger side seat 20. In one variation of the second embodiment, the size information includes height and width information regarding a person sitting in passenger side seat 20 of the automobile.

Figure 3:
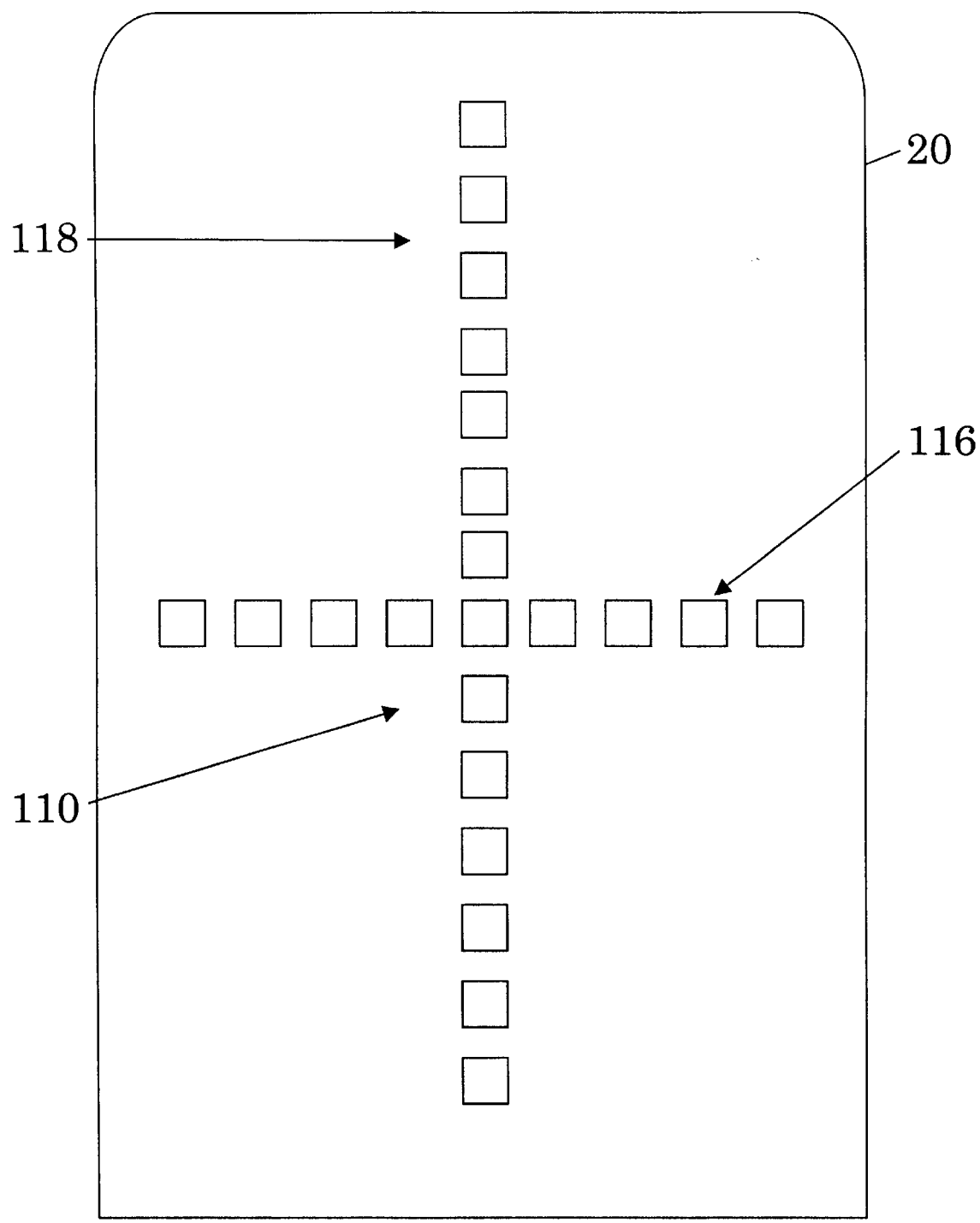
FIG. 3 is a view of the reflector used in the embodiment of the system of FIG. 2.

To determine height information and width information, reflector 110 includes a horizontal array of polarized reflectors 116 and a vertical array of polarized reflectors 118 (see FIG. 3). In addition, transmitter 24 includes at least one horizontally polarized transmit antenna 120 and at least one vertically polarized transmit antenna 122. Polarized reflectors are well known in the art and any one of a variety of conventional polarized reflectors may be used in this embodiment.

Generally, the second embodiment operates in a manner that is similar to the operation of the first embodiment. That is, transmitter 24 generates and transmits UWB pulses 32 toward reflector 110, a reflected signal portion 44 of UWB pulses 32 is reflected by reflector 110 and received by receiver 26, receiver 26 generates receiver signal 40 in response to reflected signal portion 44, and processor 28 processes receiver signal 40 to determine height and width information of a person sitting in passenger side seat 20. Specifically, transmitter 24 generates and transmits UWB pulses 32 using the horizontally polarized transmit antenna 120 to determine width information and using the vertically polarized transmit antenna 122 to determine height information.

The second embodiment determines the width information of a person sitting in passenger side seat 20 based on the amount of energy reflected by horizontal array of polarized reflectors 116. For example, to determine the width of a person sitting in passenger side seat 20, transmitter 24 transmits UWB pulses 32 toward passenger side seat 20 using horizontally polarized transmit antenna 120. If a person is absent from passenger side seat 20, then reflected signal portion 44 generated by reflectors 116 contains a large portion of the energy from UWB pulses 32. If a person is sitting in passenger side seat 20, reflected signal portion 44 generated by reflectors 116 contains a smaller portion of the energy contained within UWB pulses 32. This occurs primarily because the person is positioned between reflectors 116 and horizontally polarized antenna 120 and, consequently, prevents a portion of reflectors 116 from receiving UWB pulses 32. A person having a width larger than the width of another person will block more of the reflectors 116 and, as a result, will cause a smaller amount of energy to be reflected. Thus, the amount of energy reflected by reflectors 116 is directly related to the width of the person and the amount of energy reflected may be used to determine the width of the person.

In a similar manner, the second embodiment determines height information 112 of a person sitting in passenger side seat 20 based on the amount of energy reflected by vertical array of polarized reflectors 118. In this case, transmitter 24 transmits UWB pulses 32 toward passenger side seat 20 using vertically polarized transmit antenna 122. If a person is absent from passenger side seat 20, then reflected signal portion 44 generated by reflectors 118 contains a large portion of the energy from UWB pulses 32 and, if a person is sitting in passenger side seat 20, reflected signal portion 44 contains a smaller portion of the energy from UWB pulses 32. In addition, a person having a height larger than the height of another person will cause a smaller amount of energy to be reflected. Thus, the amount of energy reflected by vertical array of polarized reflectors 118 is directly related to the height of the person and the amount of energy reflected may be used to determine the height of the person.

In either case, receiver 26 then generates receiver signal 40 based on reflected signal portion 44 of UWM pulses 32. As was the case with the first embodiment, the receiver signal 40 is basically a voltage signal that is generated by receiver 26 based on the amount of energy received by receiver 26. For large amounts of energy, receiver 26 generates a receiver signal 40 having a large maximum voltage. If the amount of energy is low, receiver 24 generates a receiver signal 22 having a low maximum voltage.

Based on receiver signal 40, processor 28 determines the width and height information of a person present in passenger side seat 20. In one version, a memory contains a set of width voltage signals, each width voltage signal corresponding to a specific width. Processor 28 then determines the width information by comparing receiver signal 40 to the set of width voltage signals. When receiver signal 40 matches one of the width voltage signals, i.e., a matching width voltage signal, processor 28 determines that the width of the person is equal to the specific width corresponding to the matching width voltage signal. Processor 28 also contains a set of height voltage signals and determines a matching height voltage signal associated with the height of a person sitting in passenger side seat 20 in a similar manner.

Once the height information and width information have been determined, processor 28 can control deployment of passenger side airbag 48 based on this information. Specifically, if the height and width information is below predetermined criteria, then processor 28 generates a processor signal 66 that prevents airbag controller 46 from deploying passenger side airbag 48. If the height and width information is above the predetermined criteria, then processor 28 generates a processor signal 66 that allows airbag controller 46 to deploy passenger side airbag 48. Similar processing may be implemented to control a driver side airbag.

Alternatively, processor 28 may control a rate of deployment of passenger airbag 48 based on the height and width of the person. For example, rather than inhibiting deployment completely, processor 28 may generate a processor signal 66 that causes airbag controller 46 to deploy passenger side airbag 48 at a lower deployment rate when the height and weight is below predetermined criteria.

In another variation of the second embodiment, the memory contains a variety of receiver signal profiles. As was the case with a similar variation on the first embodiment, each receiver signal profile represents a receiver signal 40 indicative of a specific set of occupancy parameters. However, in this variation, the memory contains receiver signal profiles for a variety of combinations of antennas and reflectors. Specifically, memory contains receiver signal profiles corresponding to the transmission of UWB pulses 32 on horizontally polarized transmit antenna 120 and on vertically polarized transmit antenna 122 when a person is absent from passenger side seat 20. In addition, other receiver signal profiles contain information indicative of a person having a specific height and width. As before, an unlimited number of receiver signal profiles may be generated in a similar manner using small children, small adults, large adults, bags of groceries or books.

In this variation of the second embodiment, processor 28 simply compares receiver signal 40 with the receiver signal profiles and selects the matching receiver signal profile, that is, the receiver signal profile most similar to the receiver signal 40 under analysis. Processor 28 then determines height and width information based on the matching receiver signal profile. As was the case with the first embodiment, processor 28 may also process weight signal 78 to confirm that height and width information is accurate.

Figure 4:
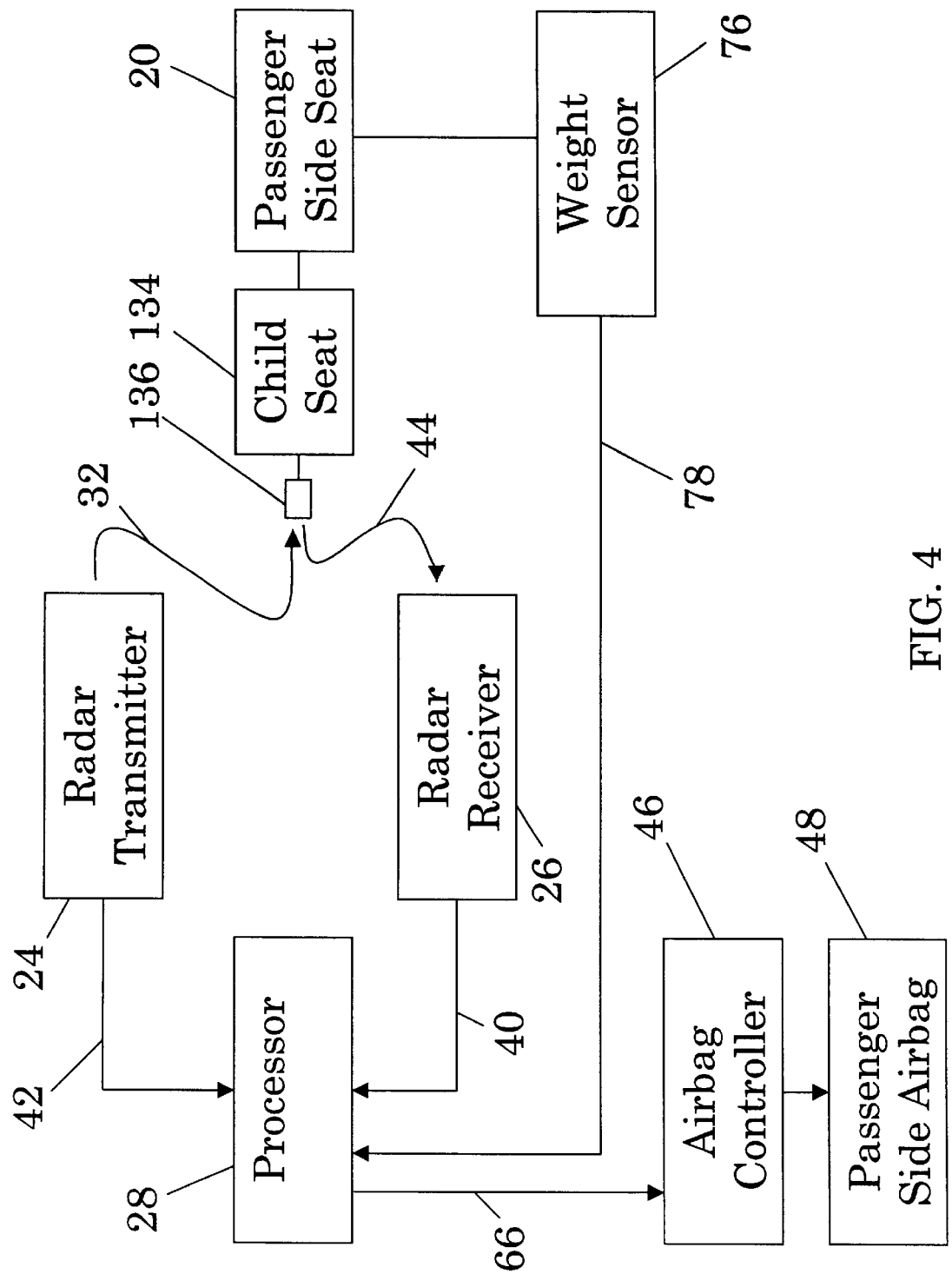
FIG. 4 is a block diagram of a third embodiment of the present invention designed to detect the presence of a child seat in the vehicle.

In a third embodiment (see FIG. 4) designed to detect the presence and position of a child seat 134 in passenger side seat 20, the present invention includes transmitter 24, receiver 26, processor 28, airbag controller 46, weight sensor 76, and passenger side airbag 48 as described above. In addition, the third embodiment includes a child seat detector 136 connected to the child seat 134. Child seat detector 136 may be a simple reflector or a polarized reflector. In either case, child seat detector 136 is designed to reflect UWB pulses 32 back toward receiver 26. As a result, child seat detector 136 should be mounted on child seat 134 so that UWB pulses 32 transmitted by transmitter 24 strike the child seat detector 136.

To determine whether child seat 134 is present in passenger side seat 20, the third embodiment operates in a manner that is similar to operation of the first embodiment. Transmitter 24 generates and transmits UWB pulses 32 toward passenger side seat 20. If child seat 134 is present in passenger side seat 20, child seat detector 136 will reflect a certain amount of energy. If child seat 134 is not present in passenger side seat 20, less energy will be reflected. Thus, reflected signal portion 44 will contain more energy when child seat 134 is present in passenger side seat 20.

As described in detail with respect to the first embodiment, receiver 26 generates receiver signal 40 based on the amount of energy received by receiver 26 and processor 28 processes receiver signal 40. Specifically, receiver 26 generates a receiver signal 40 having a high voltage when child seat 134 is present in passenger side seat 20 and a receiver signal 40 having a low voltage when child seat 134 is absent from passenger side seat 20.

Processor 28 processes receiver signal 40 and determines whether child seat 134 is present in passenger side seat 20. In one embodiment, processor 28 simply compares receiver signal 40 to a threshold voltage. If receiver signal 40 is below the threshold voltage, then processor 28 determines that child seat 134 is absent from passenger side seat 20. If, on the other hand, receiver signal is above the threshold voltage, then processor 28 determines that child seat 134 is present in passenger side seat 20. Note that the threshold voltage may have a large range of possible voltage values. In particular, the threshold voltage value used in the first embodiment may be different that the threshold voltage value used in the third embodiment.

All of the variations discussed in conjunction with the first and second embodiment may be used with the third embodiment as well. Specifically, a variation of the third embodiment may use weight sensor 76 to generate weight signal 78 in order confirm that child seat 134 is present or absent from passenger side seat 20. In addition, variations of the third embodiment may use receiver signal profiles, weight signal profiles, stationary clutter signal profiles, variable clutter signal profiles, and target response signal profiles to determine whether child seat 134 is present or absent from passenger side seat 20. Variations of the third embodiment using any of the profiles referenced above may include child seat detector 136. Alternatively, these variations may not include child seat detector 136.

Thus, although there have been described particular embodiments of the present invention of a new and useful System and Method for Controlling Airbag Deployment Systems, it is not intended that such references be construed as limitations upon the scope of this invention except as set forth in the following claims.

The invention claimed is:

1. A system for controlling airbag deployment systems in an automobile using radar, comprising:
   a radar transmitter mounted in the automobile for generating and transmitting pulses;
   a radar receiver mounted in the automobile for receiving reflected pulses indicative of vehicle occupancy and operative to generate a receiver signal in response to the reflected pulses;
   a processor in communication with the radar receiver and the radar transmitter for processing the receiver signal and controlling deployment of the airbag based on the receiver signal; and wherein
      the receiver signal includes a stationary clutter signal, variable clutter signal, and target response signal;
      the processor includes a memory containing predetermined stationary clutter signal profiles, variable clutter signal profiles, and target response signal profiles, each profile comprising a predetermined stationary clutter signal, variable clutter signal, and target response signal;
      the processor subtracts one of the stationary clutter signal profiles and one of the variable clutter signal profiles from the receiver signal to obtain a target response signal;
      the processor compares the target response signal to the predetermined target response signal profiles and identifies a matching target response signal profile; and
      the processor controls deployment of the airbag based on the matching target response signal profile.

2. The system of claim 1, wherein the processor inhibits deployment of the airbag when the target response signal matches a predetermined target response signal profile.

3. The system of claim 1, wherein the processor deploys the airbag at a predetermined rate of deployment when the target response signal matches a predetermined target response signal profile.

4. A system for controlling an airbag deployment system in a vehicle using radar, comprising:
   a radar transmitter connected to an automobile and operative to generate and transmit pulses;
   a radar receiver connected to the automobile and operative to receive reflected pulses;
   a reflector connected to a seat in the vehicle and operative to modify the reflected pulses to include size information of a person sitting in the seat, the radar receiver further operative to generate a receiver signal in response to the reflected pulses;
   a processor in communication with the radar receiver and radar transmitter and operative to process the receiver signal and control deployment of the airbag based on the receiver signal; and wherein
      the transmitter includes at least one horizontally polarized transmit antenna and is operative to transmit pulses using the horizontally polarized antenna; and
      the reflector includes a horizontal array of polarized reflectors, the horizontal array operative to modify the reflected pulses to include information regarding a width associated with the person sitting in the seat.

5. The system of claim 4, wherein:
   the transmitter includes at least one vertically polarized transmit antenna and is operative to transmit pulses using the vertically polarized antenna; and
   the reflector further includes a vertical array of polarized reflectors, the vertical array operative to modify the reflected pulses to include information regarding a height associated with the person sitting in the seat.

6. A system for controlling an airbag deployment system in a vehicle using radar, comprising:
   a radar transmitter connected to an automobile and operative to generate and transmit pulses;
   a radar receiver connected to the automobile and operative to receive reflected pulses;

a reflector connected to a seat in the vehicle and operative to modify the reflected pulses to include size information of a person sitting in the seat, the radar receiver further operative to generate a receiver signal in response to the reflected pulses;

a processor in communication with the radar receiver and radar transmitter and operative to process the receiver signal and control deployment of the airbag based on the receiver signal; and wherein the processor inhibits deployment of the airbag based on the receiver signal; and when the width falls below a predetermined threshold width and the height falls below a predetermined threshold height.

7. A system for controlling an airbag deployment system in a vehicle using radar, comprising:

a radar transmitter connected to an automobile and operative to generate and transmit pulses;

a radar receiver connected to the automobile and operative to receive reflected pulses;

a reflector connected to a seat in the vehicle and operative to modify the reflected pulses to include size information of a person sitting in the seat, the radar receiver further operative to generate a receiver signal in response to the reflected pulses;

a processor in communication with the radar receiver and radar transmitter and operative to process the receiver signal and control deployment of the airbag based on the receiver signal; and wherein the processor deploys the airbag at a predetermined rate of deployment based on the receiver signal; and the processor deploys the airbag at a predetermined rate of deployment when the width falls below a predetermined threshold width and the height falls below a predetermined threshold height.

* * * * *